US009904912B2

(12) United States Patent
Steeves et al.

(10) Patent No.: US 9,904,912 B2
(45) Date of Patent: *Feb. 27, 2018

(54) PROTECTING TRANSACTIONS (71) Applicant: Microsoft Technology Licensing, LLC, Redmond, WA (US)

(72) Inventors: David J. Steeves, Seattle, WA (US); Kim Cameron, Bellevue, WA (US); Todd L. Carpenter, Monroe, WA (US); David Foster, Bellevue, WA (US); Quentin S. Miller, Sammamish, WA (US); Gregory D. Hartrell, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 240 days.

This patent is subject to a terminal disclaimer.

(21) Appl. No.: 14/730,081

(22) Filed: Jun. 3, 2015

(65) Prior Publication Data

US 2015/0269537 A1    Sep. 24, 2015

Related U.S. Application Data

(63) Continuation of application No. 12/359,215, filed on Jan. 23, 2009, now Pat. No. 9,065,812.

(51) Int. Cl.
*G06F 21/00* (2013.01)
*G06Q 20/02* (2012.01)
(Continued)

(52) U.S. Cl.
CPC .......... *G06Q 20/027* (2013.01); *G06F 21/74* (2013.01); *G06Q 20/40* (2013.01); *H04L 63/08* (2013.01); *H04L 2463/102* (2013.01)

(58) Field of Classification Search
CPC .... H04L 63/08; H04L 2463/102; G06F 21/74
See application file for complete search history.

(56) References Cited

U.S. PATENT DOCUMENTS 6,363,474 B1   3/2002   McCulley et al.
7,085,935 B1   8/2006   Ellison et al.
(Continued)

FOREIGN PATENT DOCUMENTS

WO   2008007111   1/2008
WO   2008054456   5/2008

OTHER PUBLICATIONS

Herzog, Almut, "Execution Environment for Java Electronic Services," Department of Computer and Information Science, Linkopings University, SE-581, 83 Linkoping, Sweeden, ISBN 91-7373-561-2, 2002, 120 pages.

(Continued)

*Primary Examiner* — Brandon Hoffman
*Assistant Examiner* — Thong Truong
(74) *Attorney, Agent, or Firm* — Perkins Coie LLP (57) ABSTRACT

Technology is described for protecting transactions. The technology may include a switching component that a user can employ to switch an associated mobile device into a secure mode so that a user can confirm the transaction. After initiating a transaction request, the user can confirm the transaction request by activating the switching component, which can cause the mobile device to switch into a secure mode. In the secure mode, the mobile device may prevent the mobile device from conducting various normal activities, such as executing applications, receiving input, providing output, and so forth. The switching component may disable other processing temporarily. Upon receiving the (Continued)

confirmation from the user, the switching component may send a confirmation communication to complete the transaction.

20 Claims, 9 Drawing Sheets

(51) Int. Cl.
*H04L 29/06* (2006.01)
*G06F 21/74* (2013.01)
*G06Q 20/40* (2012.01)

(56) References Cited

U.S. PATENT DOCUMENTS

| | | |
|---|---|---|
| 9,065,812 B2 | 6/2015 | Steeves et al. |
| 2004/0024710 A1 | 2/2004 | Fernando et al. |
| 2004/0097217 A1* | 5/2004 | McClain ............... H04L 63/083 455/411 |
| 2004/0158742 A1 | 8/2004 | Srinivasan et al. |
| 2005/0091530 A1 | 4/2005 | Avraham et al. |
| 2005/0223220 A1 | 10/2005 | Campbell et al. |
| 2006/0047959 A1 | 3/2006 | Morais |
| 2006/0195907 A1 | 8/2006 | Delfs et al. |
| 2007/0192824 A1 | 8/2007 | Frank et al. |
| 2007/0192826 A1 | 8/2007 | Frank et al. |
| 2008/0127304 A1 | 5/2008 | Ginter et al. |
| 2008/0155271 A1 | 6/2008 | Barck et al. |

OTHER PUBLICATIONS

Karnouskos, Stamatis et al., "Security, Trust and Privacy in the SEcure MObile Payment Service," 3rd International Conference on Mobile Business 2004, Jul. 12-13, 2004, New York City, U.S.A, 8 pages, http://www.semops.com/uploadfiles/SEMOPS_SEC_mBusiness2004.pdf [last accessed Apr. 13, 2009].

Manadhata, Pratyusa et al., "Measuring a System's Attack Surface," School of Computer Science, Carnegie Mellon University, Pittsburgh, PA 15213, Jan. 2004, CMU-CS-04-102, 24 pages, http://www.cs.cmu.edu/~wing/publications/tr04-102.pdf [last accessed Apr. 13, 2009].

Notice of Allowance Issued in U.S. Appl. No. 12/359,215, mailed: Feb. 20, 2015, 9 Pages.

Final Office Action Issued in U.S. Appl. No. 12/359,215, mailed: Nov. 6, 2014, 19 Pages.

Non-Final Office Action Issued in U.S. Appl. No. 12/359,215, mailed: Jun. 2, 2014, 16 Pages.

Final Office Action Issued in U.S. Appl. No. 12/359,215, mailed: Jun. 20, 2012, 16 Pages.

Final Office Action Issued in U.S. Appl. No. 12/359,215, mailed: Mar. 14, 2012, 15 Pages.

Non-Final Office Action Issued in U.S. Appl. No. 12/359,215, mailed: Sep. 2, 2011, 15 Pages.

* cited by examiner

PROTECTING TRANSACTIONS

CROSS REFERENCE TO RELATED APPLICATION

This application is a continuation application of U.S. patent application Ser. No. 12/359,215, filed on Jan. 23, 2009, and entitled "PROTECTING TRANSACTIONS," which is incorporated herein in its entirety by reference.

BACKGROUND

Mobile phones are now sophisticated mobile computing systems. They can include multiple processors, memory, and various input/output devices. Mobile phones can have operating systems and can execute multiple applications, sometimes even concurrently. For example, "smart phones" are mobile phones that employ operating systems and applications designed by the assignee of the instant patent application.

Users can employ mobile phones to complete simple and complex tasks, including completing various online transactions. For example, mobile phones can be used to complete banking or other transactions. A user can employ a mobile phone to connect to a bank's computer (e.g., by using a browser on the mobile phone to connect to an Internet service offered by the bank) to transfer funds between accounts, pay bills, etc.

Smart phones may eventually even become electronic "wallets" that users use to authorize payments to vendors, such as by placing their phone proximate to a "reader" at a vendor's establishment. Upon purchasing an item, the user may place the mobile phone near the reader. The reader may read a signal from the mobile phone to authorize the transaction, such as by confirming an identifier in the mobile phone with a bank.

As the set of features a phone offers increases, so does its "attack surface." An attack surface comprises the set of points that a malicious entity can employ to break into any security features that a mobile phone, its operating system, or applications provide. Examples of some of the points comprising an attack surface include application program interfaces (APIs) provided by the operating system or an application. A malicious entity can install a component such as an application, object, dynamic link library, or other component to intercede when an online transaction occurs, such as to surreptitiously record and re-transmit credit card numbers, authorize transactions without the user's awareness, and so forth. To do so, the component can interject input or output, such as by employing the operating system's API to detect and/or interject keystrokes.

SUMMARY

Technology is described for protecting transactions. A transaction can include any sort of request, such as an operating system request, financial request, or other request. The request can be initiated by a user or a component. A transaction can be initiated remotely, such as at a mobile phone, but completed elsewhere, such as at a server. The technology may include a switching component that a user can use—or that can be automatically signaled—to switch an associated mobile device into a secure mode so that a user can confirm the transaction. When the user activates the switching component, the mobile device switches into a secure mode. In the secure mode, the mobile device may disable processors from conducting various normal activities, such as executing applications, receiving input, providing output, and so forth. Upon receiving the confirmation from the user, the switching component may send a confirmation communication to complete the transaction, and may then re-enable disabled activities.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Technology is described for protecting transactions, such as transactions at mobile phones. A transaction can include any sort of request, such as an operating system request, financial request, or other request. The request can be initiated by a user or a component, such as an application, service, etc. A transaction can be initiated remotely, such as at a mobile phone, but completed elsewhere, such as at a server. In various embodiments, the technology includes a switching component. A user can employ the switch to confirm a transaction using a reduced attack surface. As an example, when a transaction is to be confirmed, the user can employ the switch to cause the computing device (e.g., mobile phone) into a mode that employs one of its processors that may have a smaller attack surface than its other processors. When the switching component is activated, it may disable all processors other than one of the processors ("secure processor") from accessing input or output devices. The other processors may, however, continue other execution. The secure processor may be a processor with a smaller attack surface than the other processors that are disabled. The secure processor may be similar to the other, now disabled, processors in other respects.

In various embodiments, the user may receive a signal that the switching component should be activated. The signal may be any sort of output of the computing device, such as a visual, auditory, or tactile signal. As examples, the computing device may display a message, illuminate a lamp, emit a sound, cause a vibration, etc. In various embodiments, the user may activate the switching component after requesting a transaction even though the computing device has not provided a signal.

In various embodiments, the switch can be automatically signaled to switch an associated mobile device into a secure mode so that a user can confirm the transaction. As an example, when a user initiates a transaction from a mobile device to a server, the server can send a communication ("challenge") that is detected by the switching component. Upon detecting the communication, the switching component can cause the mobile device to switch into a secure mode.

When the user activates the switch, the computing device can be switched to a secure mode. In the secure mode, the switching component may disable the mobile device from conducting various normal activities, such as executing applications, receiving input, providing output, and so forth. To do so, the switching component may provide a visual signal to the user (e.g., via a display or light, speaker, vibration, etc.) that a confirmation is required and may also disable all other processing temporarily, such as by "switching off" processors that are not secured. In various embodiments, the processors that are "switched off" may be able to perform all computations other than receive input from input devices or provide output to output devices. For example, the switching component may temporarily disable a main processor and employ only a secure processor to receive a confirmation from the user.

The confirmation expected from the user may be a specific user input, such as depressing a switch or button, entering a password, etc. Upon receiving the confirmation from the user, the switching component may send a confirmation communication (e.g., response to the challenge) and then re-enable disabled activities. The switching component (or some other validating component) may send a confirmation communication to the component that sent the challenge.

The secure processor can be a processor with limited capability that the operating system of the mobile device generally does not employ to execute applications. The confirmation communication may be a message that contains a digital signature, an encrypted code or password, or other secure confirmation that cannot be easily duplicated. The server may await the confirmation communication from the mobile device before completing the transaction.

Several embodiments of the facility are described in more detail in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable media that may store instructions that implement the importance system. In addition, the data structures and message structures may be stored or transmitted via a data transmission medium, such as a signal on a communications link. Various communications links may be used, such as the Internet, a local area network, a wide area network, or a point-to-point dial-up connection.

Figure 1:
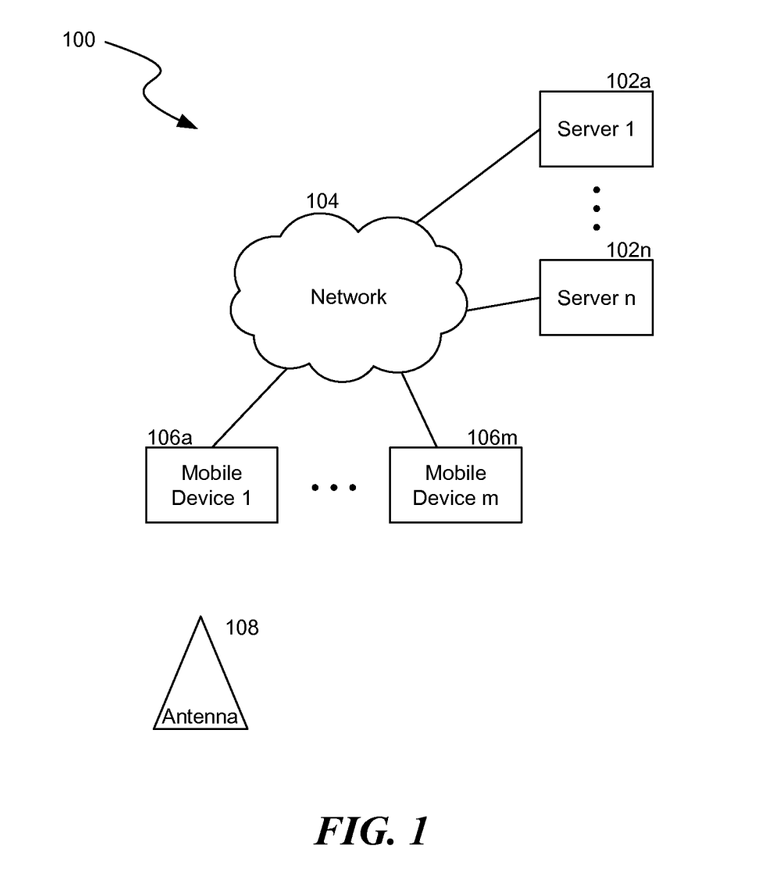
FIG. 1 is a block diagram illustrating components employed by the technology in various embodiments.

FIG. 1 is a block diagram illustrating components employed by the technology in various embodiments. The environment 100 in which the technology operates can include one or more servers 102a through 102n, a network 104 (e.g., an intranet or the Internet), and one or more computing devices, such as mobile computing devices 106a through 106m. Other varieties of computing devices can also be employed. The mobile computing devices may be handheld devices, such as mobile telephones. The mobile computing devices may wirelessly communicate with other devices, such as to communicate voice, video, or other information, via an antenna 108. The antenna 108 can exchange radiofrequency or other signals with a corresponding antenna (not shown) associated with the mobile computing devices.

Figure 2A:
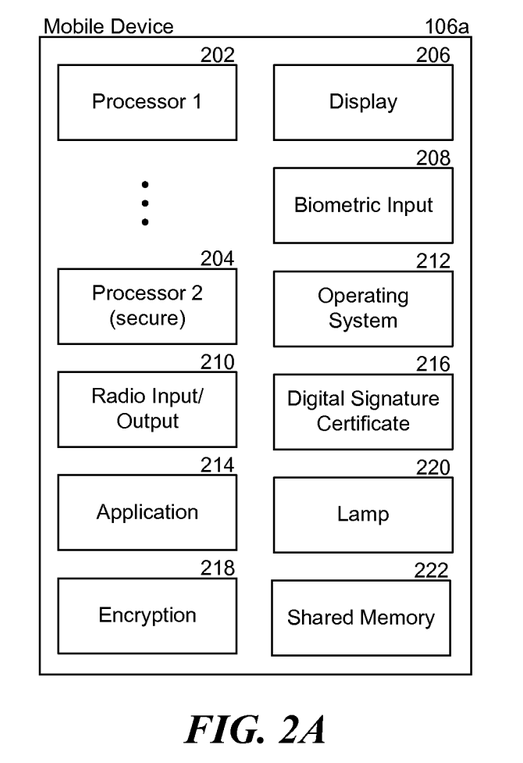
FIGS. 2A-2B are block diagrams illustrating components employed by the technology in various embodiments.

FIG. 2A is a block diagram illustrating components employed by the technology in various embodiments. The components of a computing device, such as mobile device 106a, can include one or more processors, such as processors 202 and 204. A first processor 202 can be a processor that the mobile device employs to execute its operating system 212, application 214, or other routines. For example, the first processor can be a conventional reduced instruction set processor. A second processor 204 can be a secure processor that has a minimal attack surface. For example, the second secure processor can be a processor that is employed for the limited purpose of authenticating or verifying transactions. An example of such a processor is a processor that is embedded in some subscriber identification module ("SIM") cards that mobile phones can employ. The first and second processor may exchange data, such as via a shared memory 222. For example, the first processor can store data from a challenge it receives from a server in the shared memory so that when the user switches the mobile device into a secure mode, the second processor can retrieve the data from the secure memory without requiring the first processor to execute any instructions. In various embodiments, the first and second processor may be highly similar or even identical, but one may be more secure than the other because it uses a different operating system, may have reduced input/output connections, etc.

The mobile device may have a radio input/output component 210 that it can employ to send and/or receive radio signals. As an example, the mobile device may receive challenge messages via the radio input on a different frequency (or using a different radio communications mechanism) than the frequency or radio communications mechanism that the mobile device employed to request a transaction. The computing device may include an encryption component 218 that it employs to encrypt communications, such as responses to challenges. The computing device can also include a display 206 (e.g., lights and/or display panels), biometric input component 208, operating system 212, digital signature certificate 216, and lamp 220. The biometric input component 208 can receive and/or interpret input based on fingerprint, retina scan, camera-based facial recognition, touch and/or pressure sensors, heat sensors, accelerometers, and so forth. The digital signature certificate 216 can create and/or store digital signatures. The lamp 220 can indicate that the user needs to respond to a challenge to authorize a transaction.

Figure 2B:
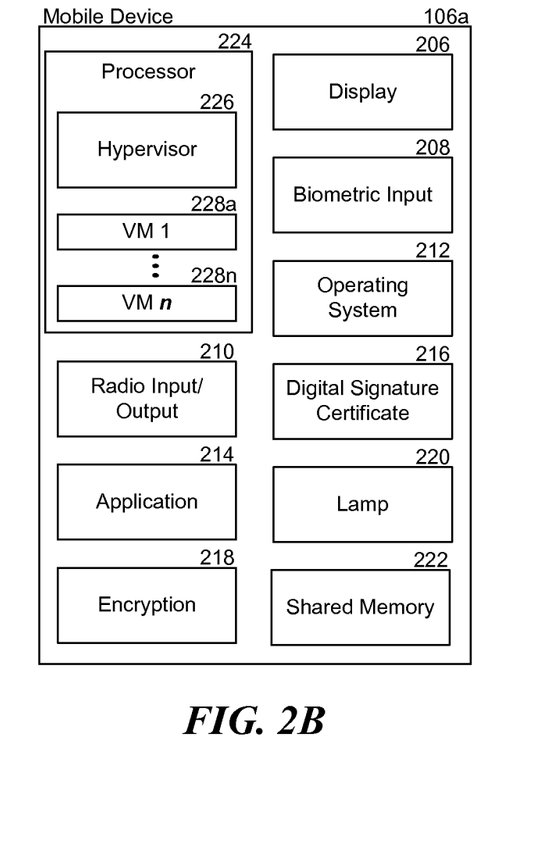

FIG. 2B is a block diagram illustrating components employed by the technology in various embodiments. The components are similar to the components described above in relation to FIG. 2A, except that the computing device can include a processor 224 that has a hypervisor 226. A hypervisor is a component that enables a processor to offer multiple processing capabilities. As an example, the processor may offer multiple "virtual machines" that each can execute its own operating system. The processor 224 is illustrated as executing virtual machine 1 228a through virtual machine n 228n. When the switching component is activated, it may cause the processor 224 to switch to a virtual machine that reduces (e.g., minimizes) the attack surface.

Figure 3:
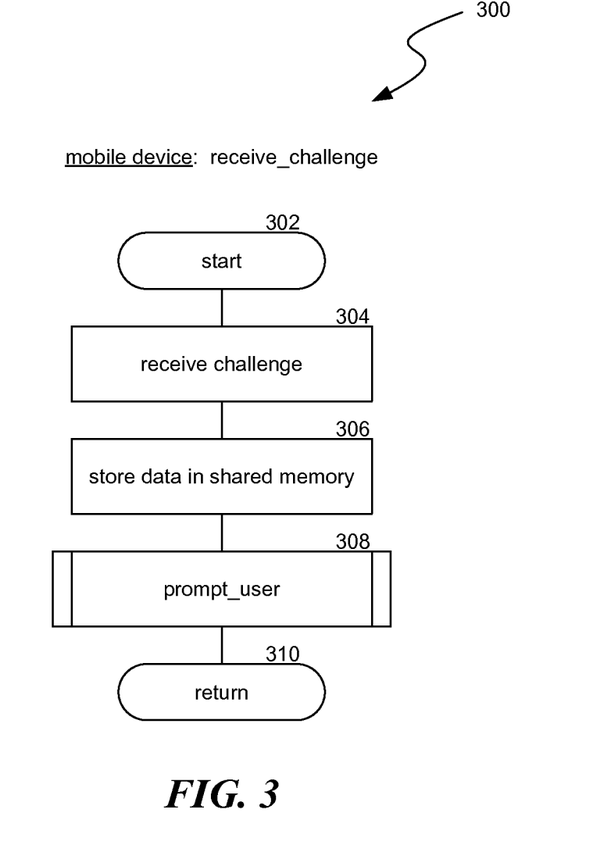
FIG. 3 is a flow diagram illustrating a method invoked by the technology in various embodiments to receive challenge messages.

FIG. 3 is a flow diagram illustrating a method invoked by the technology in various embodiments to receive challenge messages. The routine 300 may be invoked by a mobile device when it receives a challenge. The routine 300 begins at block 302. At block 304, the routine receives a challenge, such as a communication sent by a server in response to a request for a transaction. At block 306, the routine stores data from the receive challenge in a shared memory. As an example, the routine may store a subset of the data that is contained in the challenge communication that another routine of the mobile device can employ to determine that a user needs to confirm the transaction. (Herein in relation to transactions, confirm, authorize, verify, and the like are employed as synonyms.) At block 308, the routine invokes a prompt_user subroutine to prompt the user to confirm the transaction. The prompt_user subroutine is described in further detail below in relation to FIG. 5. At block 310, the routine returns.

Those skilled in the art will appreciate that the logic illustrated in FIG. 3 and described above, and in each of the flow diagrams discussed below, may be altered in a variety of ways. For example, the order of the logic may be rearranged, substeps may be performed in parallel, illustrated logic may be omitted, other logic may be included, etc.

Figure 4:
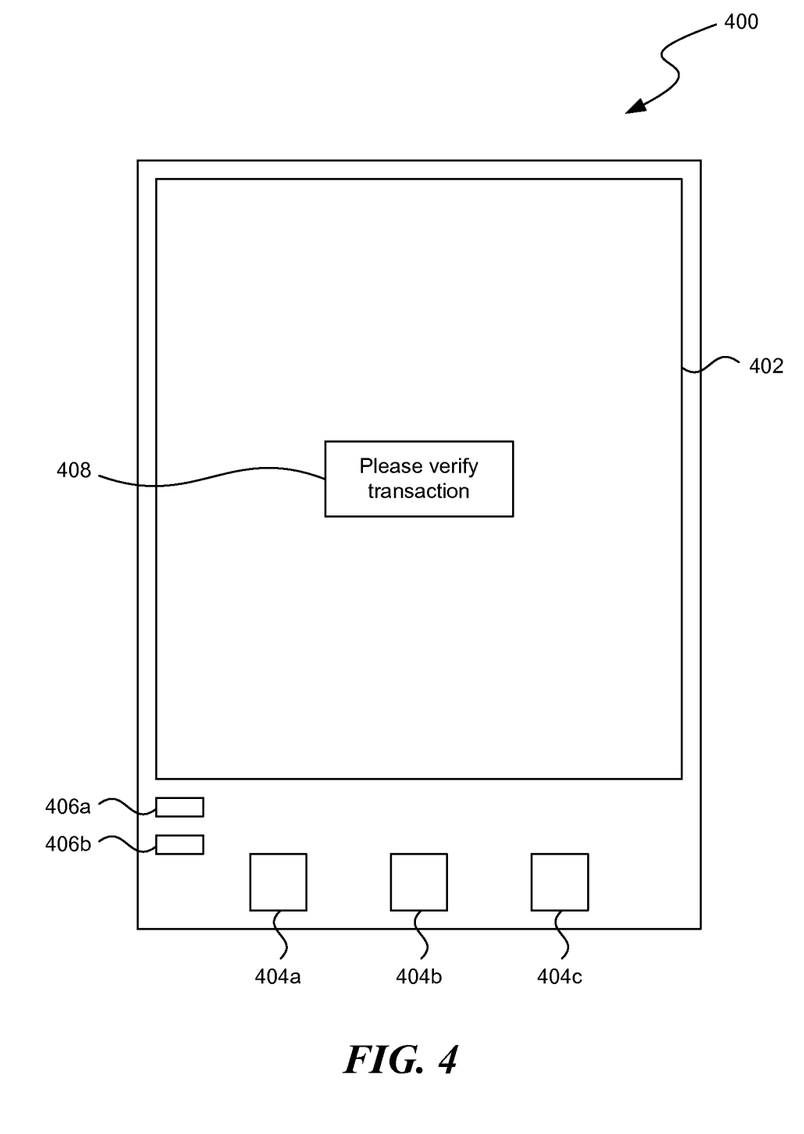
FIG. 4 is a block diagram illustrating a user interface provided by the technology in some embodiments.

FIG. 4 is a block diagram illustrating a user interface provided by the technology in some embodiments. A computing device, such as a mobile device 400, can include a display 402, buttons 404a, 404b, and 404c, and indicators or lamps 406a and 406b. The mobile device may indicate to the user via a lamp 406a that the user needs to confirm the transaction. The mobile device may also display a message 408 in the display 402 to prompt the user to confirm the transaction. The user may then confirm the transaction by depressing a key 404a.

Figure 5:
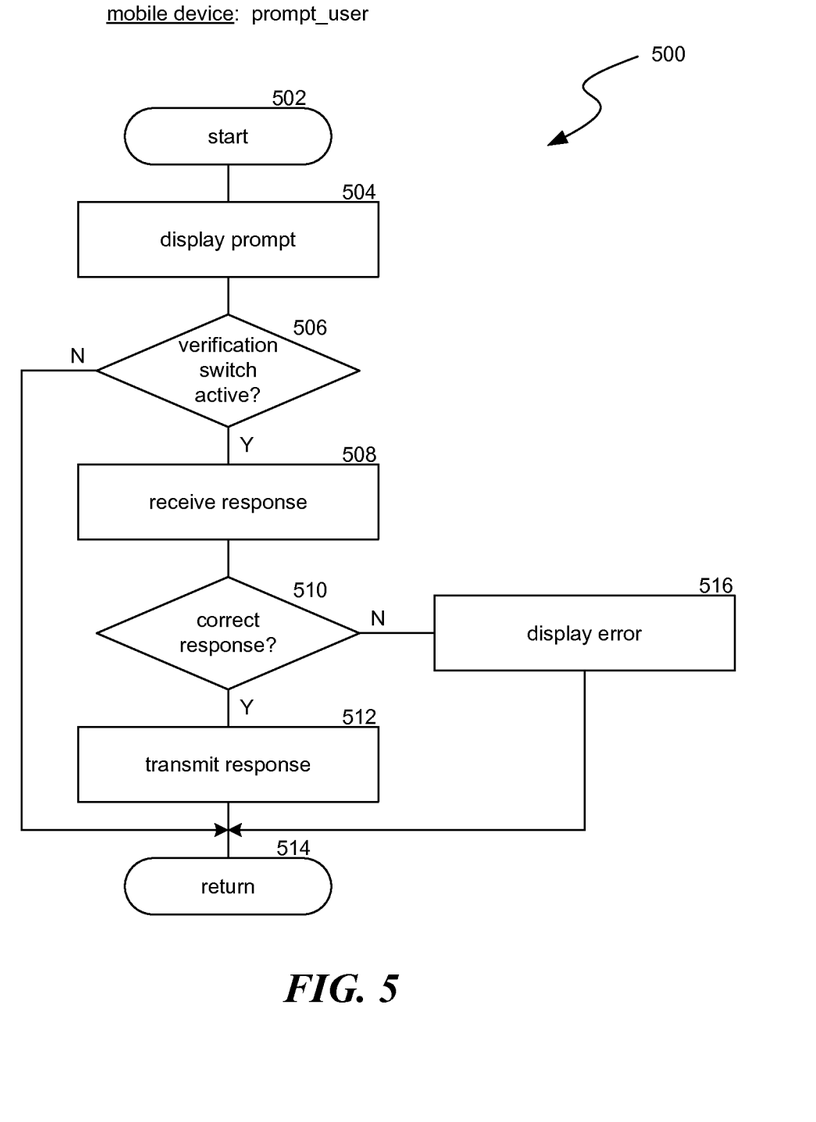
FIG. 5 is a flow diagram illustrating a method invoked by the technology in various embodiments to prompt users.

FIG. 5 is a flow diagram illustrating a method invoked by the technology in various embodiments to prompt users. A mobile device may invoke the routine 500 to prompt a user to confirm the transaction. The routine 500 begins at block 502. At block 504, the routine may display a prompt, such as in a display. Alternatively, or in addition, the routine may indicate that the transaction needs to be confirmed by illuminating a lamp. At decision block 506, the routine determines whether a verification switch is active. The routine may wait for a specified threshold period of time before determining that the verification switch is not active (not illustrated). If the verification switch is not active after the specified period of time, the routine continues at block 514, where it returns. Otherwise, the routine continues at block 508. At block 508, the routine receives a response from the user. As an example, the routine may receive an indication that the transaction is to be authorized. The indication can be an entry of a password, depression of a key, etc. In various embodiments, the server that requests the confirmation may indicate in the challenge what confirmation will be acceptable. As an example, a financial transaction may require a confirmation including a password whereas another transaction may require only depression of a key. At decision block 510, the routine determines whether the response received from the user is correct or acceptable by the server. If the response is correct or acceptable, the routine continues at block 512, where it transmits an indication of the response to the server. Otherwise, the routine may display an error at block 516. The routine then returns at block 514.

Figure 6:
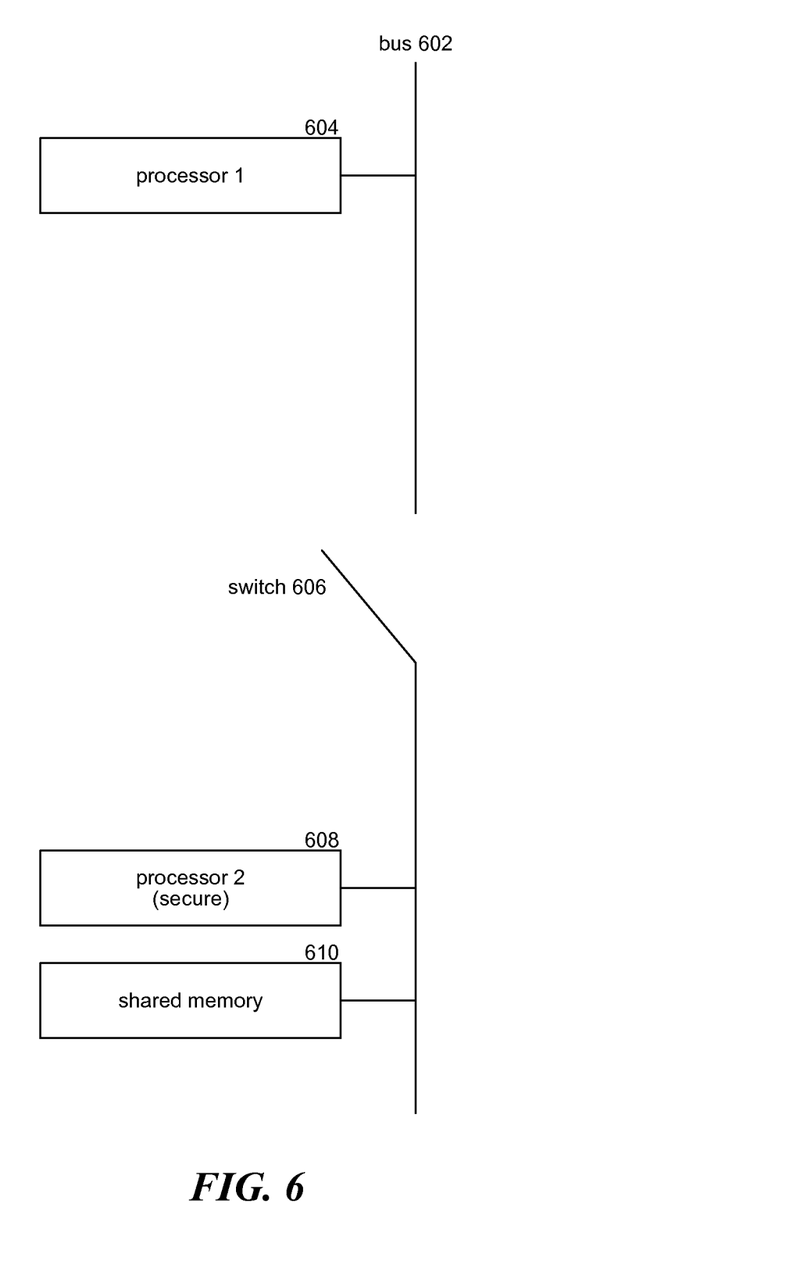
FIG. 6 is a block diagram illustrating components employed by the technology in various embodiments.

FIG. 6 is a block diagram illustrating components employed by the technology in various embodiments. A computing device can include a bus 602 to which one or more processors and a memory are connected. For example, the bus 602 can be connected to a first processor 604 and a second, secure processor 608. A shared memory 610 can also be connected to the bus. When a switch 606 is open, the first processor is disconnected from the other components, such as the second processor and the shared memory. The switch may initially be closed. When the computing device receives a challenge, it may suspend the first processor and open the switch. The switch may remain open until the user confirms or rejects the transaction. Thereafter the switch closes and the first processor is again operational.

Figure 7:
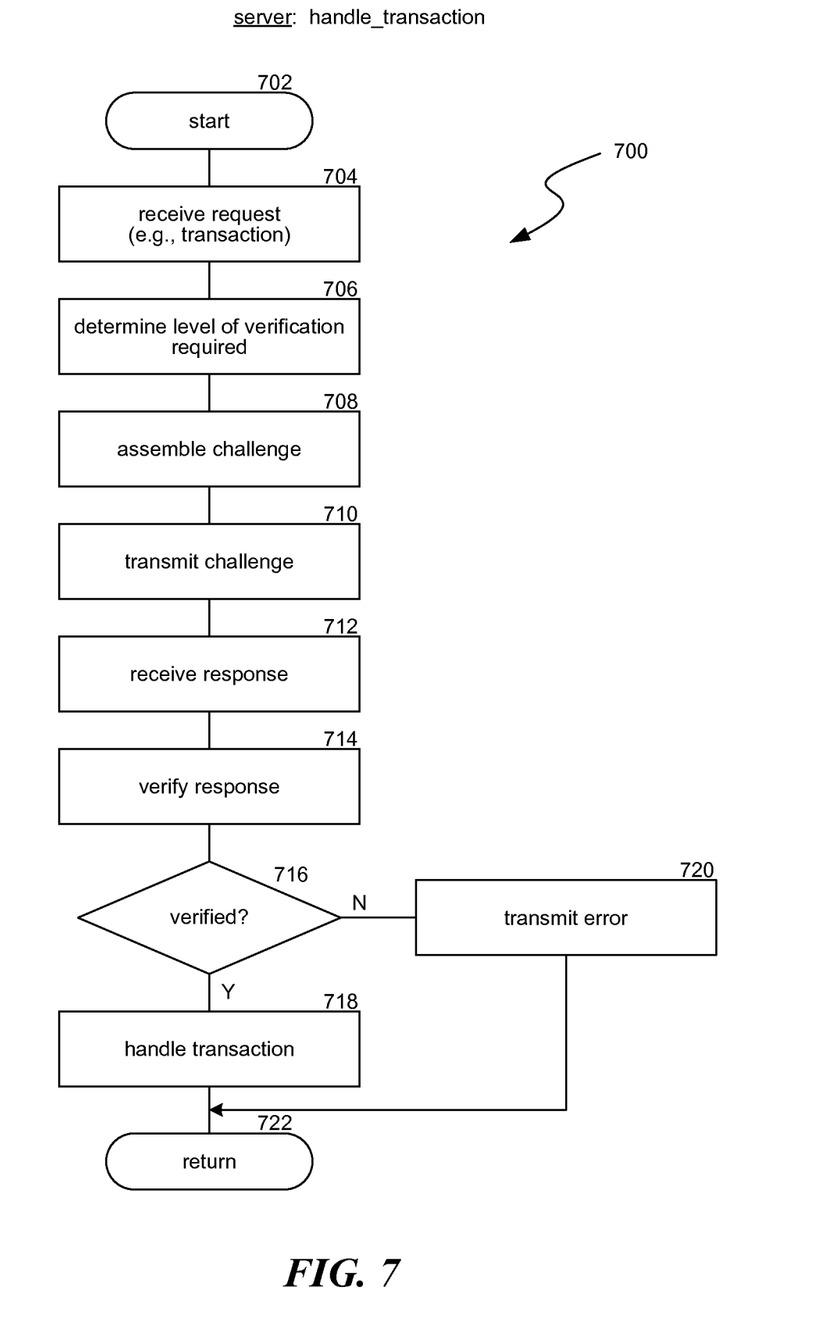
FIG. 7 is a flow diagram illustrating a method invoked by the technology in various embodiments to handle transactions.

FIG. 7 is a flow diagram illustrating a method invoked by the technology in various embodiments to handle transactions. A server may invoke the routine 700 to handle a transaction, such as upon receiving a transaction request. The routine 700 begins at block 702. At block 704, the routine receives a request, such as the transaction request. At block 706, the routine determines a level of verification required for the transaction. At block 708, the routine assembles a challenge. The challenge can be communication that the server transmits to the client computing device (e.g., mobile device) in response to the received transaction request. The communication can include information that the client computing device can employ in preparing a response to the challenge. As an example, the challenge can include a key that the client computing device can transform into an acceptable response to the challenge. At block 710, the routine transmits the challenge to the computing device that requested the transaction. It may then wait for a response. At block 712, the routine receives a response to the challenge. At block 714, the routine verifies the received response. As an example, the routine may verify that the response contains the correct transformation of the key, encrypted information, digitally signed information, etc. At decision block 716, the routine verifies the challenge. If the challenge is verified, the routine continues at block 718. Otherwise, the routine continues at block 720 where it returns an error. At block 718, the routine handles the transaction. The routine returns at block 722.

Figure 8:
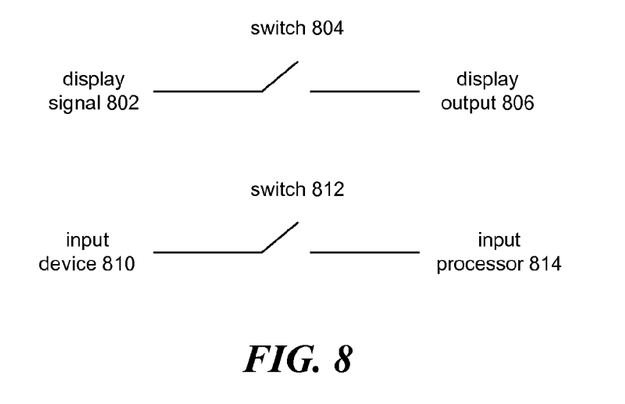
FIG. 8 is a block diagram illustrating components employed by the technology in various embodiments.

FIG. 8 is a block diagram illustrating components employed by the technology in various embodiments. A computing device (e.g., a mobile device) can employ switching components to selectively disable displays, other output devices, input devices, storage, and so forth. For example, a switching component 804 can prevent a display signal 802 from reaching a display output 806. A switching component 812 can prevent an input device 810 from transmitting input signals (e.g., keyboard, stylus, etc.) to an input processor 814. These switching components can work with switching component 606 of FIG. 6.

Various embodiments of the technology will now be described. The embodiments may operate independently or jointly.

The technology can invoke a method for protecting a remotely initiated transaction, wherein the method comprises initiating a transaction by sending a request from a client computing device to a server computing device; receiving a communication from the server computing device, the communication indicating a challenge; causing the client computing device to disable an unsecure processor so that a secure processor can verify the remotely initiated transaction with a user; indicating the challenge to the user; receiving a confirmation from the user; and transmitting a confirmation message to the server computing device so that the server computing device can complete the transaction. The challenge can include an indication that a secure computing environment should confirm the challenge. The indication can include an indication of a required level of security. The method can include disabling an input device of the client computing device. The method can include disabling an output device of the client computing device. The method can include disabling execution of an application executing on the client computing device. The method can include disabling execution of all applications executing on the client computing device. The method can include sending a signal to the unsecure processor that it is to be temporarily disabled. The method can include storing by the unsecure processor a portion of the received communication in a shared memory. The secure processor can read the portion of the received communication in the shared memory and generate a signal (e.g., encrypted confirmation or transformed key) based on the read portion of the received communication. The method can then transmit the confirmation message.

The technology can include one or more computer-readable media collectively storing computer-readable instructions that, when executed, perform a method for protecting a remotely initiated transaction, the method comprising: receiving a communication from the server computing device, the communication indicating a challenge; causing the client computing device to disable a processor so that a secure processor can verify the remotely initiated transaction with a user; indicating the challenge to the user; receiving input from the user; and if the input is a confirmation, transmitting a confirmation message to the server computing device so that the server computing device can complete the transaction. The method can display a prompt to the user to confirm the remotely initiated transaction. The method may open a switch upon receiving the communication. The method may then close the switch upon receiving the input from the user.

The technology can include a system for protecting a remotely initiated transaction, comprising: a component configured to initiate a transaction by transmitting a request from a client computing device to a server computing device; a component configured to receive a communication from the server computing device, the communication indicating a challenge; and a component configured to cause the client computing device to disable a processor so that a secure processor can verify the remotely initiated transaction with a user. The system can include a component configured to indicate the challenge to the user. The system can include a component configured to receive input from the user and, if the input is a confirmation, transmit a confirmation message to the server computing device so that the server computing device can complete the transaction. The system can include a bus to which the processor and the secure processor are both connected; a shared memory connected to the bus; and wherein the component configured to cause the client computing device to disable the processor is a switch.

The technology can include one or more computer-readable media storing computer-readable instructions that, when executed, perform a method for protecting a transaction, the method comprising: receiving a signal to employ a secure processor; causing the client computing device to disable a processor so that the secure processor can verify a transaction; receiving input from the user; and if the input is a confirmation, communicating a confirmation message. The method can display a prompt to the user to confirm the transaction. The method can open a switch prior to receiving the signal and/or close the switch upon receiving the input from the user.

The technology can include a system for protecting a transaction, comprising: a component configured to initiate a transaction by transmitting a request from a client computing device to a service; a component configured to receive a communication from the service, the communication indicating a challenge; and a component configured to cause the client computing device to disable a processor so that a secure processor can verify the remotely initiated transaction with a user. The system can include a component configured to indicate the challenge to the user. The system can include a component configured to receive input from the user and, if the input is a confirmation, transmit a confirmation message to the service so that the service can complete the transaction. The system can include a bus to which the processor and the secure processor are both connected; a shared memory connected to the bus; and wherein the component configured to cause the client computing device to disable the processor is a switch.

The technology can thus be used in various embodiments to confirm transactions generated locally at the computing device for transactions to be completed locally or remotely.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A system for protecting a transaction, comprising:
a memory;
one or more processors;
a transceiver configured to:
receive an indication of the transaction from a client computing device;
send a communication to the client computing device, the communication indicating a challenge,
wherein the challenge is configured to cause the client computing device to disable an unsecure processor so that a secure processor can verify the transaction, and
wherein the secure processor and the unsecure processor differ in at least a set of input/output connections included for each processor, such that the secure processor has a comparatively smaller attack surface due to having fewer input/output connections than the unsecure processor; and
receive a confirmation of the transaction; and
a confirmation analysis component configured to verify that the confirmation includes information that satisfies the challenge.

2. The system of claim 1, wherein the challenge includes a key, and wherein the confirmation analysis component verifies that the confirmation includes information to satisfy the challenge by verifying that the confirmation is associated with the key.

3. A method performed by a computing system for protecting a transaction, the method comprising:
initiating the transaction by sending a request from a client computing device to a server computing device;
receiving a communication from the server computing device indicating the initiated transaction;
causing the client computing device to disable an unsecure processor so that a secure processor can verify the transaction,
wherein the secure processor and the unsecure processor differ in at least a set of input/output connections included for each processor, such that the secure processor has a comparatively smaller attack surface due to having fewer input/output connections than the unsecure processor.

4. The method of claim 3 further comprising:
   storing, by the unsecure processor, a portion of the received communication in a shared memory; and
   reading, by the secure processor, the portion of the received communication in the shared memory.

5. The method of claim 3, wherein disabling the unsecure processor comprises disabling access to an input device of the client computing device.

6. The method of claim 3, wherein the secure processor is only employed to authenticate or verify transactions.

7. The method of claim 3, wherein the secure processor is embedded in a SIM card.

8. The method of claim 3, wherein disabling the unsecure processor comprises disabling access to an output device of the client computing device.

9. The method of claim 3 wherein, when the unsecured processor is disabled, the unsecured processor continues to process other processing threads not related to verifying the transaction.

10. The method of claim 3 further comprising disabling execution of an application executing on the client computing device.

11. The method of claim 3 further comprising:
    requesting a confirmation of the transaction;
    receiving the confirmation of the transaction; and
    transmitting a confirmation message to the server computing device;
    wherein the challenge includes an indication that a secure computing environment should confirm the challenge.

12. The method of claim 11, wherein requesting a confirmation of the transaction comprises one or more of: a light notification to a user, a vibration notification to the user, an internal signal that is automatically handled by the client computing device, or any combination thereof.

13. The method of claim 11, wherein the confirmation of the transaction comprises one or more of: a user actuating a button, a user actuating a switch, a user actuating a control displayed on a display component, an automatic response from the client computing device, or any combination thereof.

14. The method of claim 11, wherein the communication from the server includes a key that the client device uses to create the confirmation message.

15. The method of claim 11, wherein the indication includes an identification of a required level of security.

16. The method of claim 15, wherein the communication from the server computing device includes a challenge that is based on the required level of security.

17. A computer-readable storage medium storing instructions that, when executed by a computing system, cause the computing system to perform operations for protecting a transaction, the operations comprising:
    receiving an indication of the transaction from a client computing device;
    sending a communication to the client computing device, the communication indicating a challenge,
        wherein the challenge is configured to cause the client computing device to disable an unsecure processor and verify the transaction with a secure processor, and
        wherein the secure processor and the unsecure processor differ in at least a set of input/output connections included for each processor, such that the secure processor has a comparatively smaller attack surface due to having fewer input/output connections than the unsecure processor;
    receiving a confirmation of the transaction; and
    verifying that the confirmation includes information to satisfy the challenge.

18. The computer-readable storage medium of claim 17, wherein the challenge includes a key; and
    wherein verifying that the confirmation includes information to satisfy the challenge includes verifying that the confirmation is associated with the key.

19. The computer-readable storage medium of claim 17, wherein, when the unsecured processor is disabled, the unsecured processor continues to process other processing threads not related to verifying the transaction.

20. The computer-readable storage device of claim 17, wherein the received confirmation was generated at the client computing device in response to one or more of: a user actuating a button, a user actuating a switch, a user actuating a control displayed on a display component, an automatic response to the challenge from the client computing device, or any combination thereof.

* * * * *